US010351439B2

United States Patent
Krempels

(10) Patent No.: US 10,351,439 B2
(45) Date of Patent: Jul. 16, 2019

(54) PRODUCTION OF NANOPARTICULATE TITANIUM DIOXIDE

(71) Applicant: Kronos International, Inc., Leverkusen (DE)

(72) Inventor: Heinz-Christian Krempels, Krefeld (DE)

(73) Assignee: Kronos International, Inc., Leverkusen (DE)

(*) Notice: Subject to any disclaimer, the term of this patent is extended or adjusted under 35 U.S.C. 154(b) by 46 days.

(21) Appl. No.: 15/618,496

(22) Filed: Jun. 9, 2017

(65) Prior Publication Data

US 2017/0355612 A1 Dec. 14, 2017

(30) Foreign Application Priority Data

Jun. 14, 2016 (EP) .................................. 16001339

(51) Int. Cl.
| | | |
|---|---|---|
| C01G 23/053 | (2006.01) | |
| B01J 20/06 | (2006.01) | |
| B01J 37/00 | (2006.01) | |
| B01J 37/08 | (2006.01) | |
| B01J 20/28 | (2006.01) | |
| B01J 20/30 | (2006.01) | |
| B01J 21/06 | (2006.01) | |
| B01J 35/00 | (2006.01) | |
| B01J 35/10 | (2006.01) | |
| B01D 53/02 | (2006.01) | |
| C02F 1/28 | (2006.01) | |
| B01J 35/02 | (2006.01) | |
| C02F 101/20 | (2006.01) | |

(52) U.S. Cl.
CPC .......... C01G 23/053 (2013.01); B01D 53/02 (2013.01); B01J 20/06 (2013.01); B01J 20/2803 (2013.01); B01J 20/28004 (2013.01); B01J 20/3085 (2013.01); B01J 21/063 (2013.01); B01J 35/004 (2013.01); B01J 35/0013 (2013.01); B01J 35/023 (2013.01); B01J 35/1019 (2013.01); B01J 37/0036 (2013.01); C01G 23/0532 (2013.01); C02F 1/281 (2013.01); B01D 2253/1124 (2013.01); B01D 2255/20707 (2013.01); B01D 2255/802 (2013.01); B01D 2257/60 (2013.01); B01J 37/0009 (2013.01); C01P 2004/50 (2013.01); C01P 2004/61 (2013.01); C01P 2004/64 (2013.01); C01P 2006/12 (2013.01); C02F 2101/20 (2013.01)

(58) Field of Classification Search
CPC ............. C01G 23/053; C01G 23/0532; C01G 23/0536; B01J 20/2803; B01J 21/063; B01J 37/009; B01J 37/08; B01J 37/033
See application file for complete search history.

(56) References Cited

U.S. PATENT DOCUMENTS

| | | | | |
|---|---|---|---|---|
| 4,599,114 A | * | 7/1986 | Atkinson | ................. C08K 9/04 106/31.67 |
| 8,512,664 B1 | * | 8/2013 | Trabzuni | ................. C01B 33/32 423/324 |
| 2005/0226761 A1 | * | 10/2005 | Orth-Gerber | ......... C09C 1/3669 420/417 |
| 2006/0115411 A1 | * | 6/2006 | Jensen | ..................... B01J 3/008 423/611 |
| 2011/0180769 A1 | * | 7/2011 | Lamminmaki | ...... C01G 23/047 252/588 |
| 2013/0144017 A1 | * | 6/2013 | McDaniel | ............. C08F 110/02 526/113 |

FOREIGN PATENT DOCUMENTS

| | | |
|---|---|---|
| CN | 104209108 A | 12/2014 |
| DE | 10392330 B4 | 1/2013 |

* cited by examiner

*Primary Examiner* — Jun Li
(74) *Attorney, Agent, or Firm* — Locke Lord LLP

(57) ABSTRACT

The invention relates to a method for obtaining nanoparticulate titanium dioxide in agglomerate form from a hydrolyzed acidic titanyl compound, the thus obtained titanium dioxide as well as the use thereof as a photocatalyst, process catalyst or adsorbent, especially in aqueous systems.

26 Claims, No Drawings

PRODUCTION OF NANOPARTICULATE TITANIUM DIOXIDE

RELATED APPLICATION

This application claims the benefit of Patent Application No. EP 16001339.7 filed on Jun. 14, 2016.

BACKGROUND

Field of the Invention

The invention relates to a method for obtaining nanoparticulate titanium dioxide in agglomerate form from a hydrolyzed acidic titanyl compound, the thus obtained titanium dioxide as well as the use thereof as a photocatalyst, process catalyst or adsorbent, especially in aqueous systems.

Technological Background of the Invention

Nanoparticulate titanium dioxide is widely used as an adsorbent, as a process catalyst or as photocatalyst due to its high specific surface area and semiconductor character. The commercial production of nanoparticulate titanium dioxide is usually effected through the hydrolysis of an acidic titanyl compound, such as titanyl chloride or titanyl sulfate, followed by thermal treatment. Titanyl sulfate, for example, is produced by the sulfuric acid digestion of titanium iron raw materials, such as ilmenite ore.

When titanyl sulfate is used as starting compound, the titanium oxide-hydrate (meta-titanic acid) formed by hydrolysis of titanyl sulfate is separated from the acidic suspension and washed in order to remove other metal salts and adhering sulfuric acid. Further, the titanium oxide-hydrate must be neutralized as usually from 5% to 10% by weight of chemisorbed sulfuric acid remains despite intensive washing. The neutralization is usually performed as disclosed in DE 103 92 330 B4 and CN 104 209 108 A by means of alkaline compounds, such as sodium hydroxide or calcium hydroxide.

Using calcium hydroxide, also known as milk of lime, in the neutralization step results in formation of sparingly soluble calcium sulfate, so that porous agglomerates of titanium dioxide and calcium sulfate are obtained as products. However, the neutralization with calcium hydroxide leads to cracking in the filter cake during the washing, making intensive washing of the filter cake impossible. Further, the calcium sulfate formed shows a residual solubility of calcium ions in aqueous systems.

Using sodium hydroxide in the neutralization step results in the formation of readily soluble sodium sulfate, which can be washed out completely. However, using sodium hydroxide also results in a very finely divided titanium dioxide product, which is difficult to handle.

Thus, there is a need for a neutralization method for acidic titanium oxide-hydrate that leads to a nanoparticulate agglomerated titanium dioxide product, in which a readily washable filter cake and insoluble compounds are formed.

BRIEF DESCRIPTION OF THE INVENTION

It is an object of the invention to provide a neutralization method for titanium oxide-hydrate that contains sulfuric acid and that is to be processed further into a nanoparticulate titanium dioxide product, in which insoluble compounds and a readily washable filter cake are formed.

It has been surprisingly found by the inventors that a method for producing nanoparticulate titanium dioxide comprising the steps of (i) providing an aqueous solution of an acidic titanyl compound; (ii) hydrolyzing the titanyl compound to produce a titanium oxide-hydrate suspension; (iii) filtering the suspension and washing the obtained titanium oxide-hydrate filter cake; (iv) neutralizing the filter cake; and (v) thermally treating the filter cake, which is characterized in that said neutralizing is effected by adding an aqueous solution of alkali silicate and/or alkali aluminate results in a nanoparticulate titanium dioxide product, in which insoluble compounds and a readily washable filter cake are formed.

Therefore, in a first aspect, the present invention is directed to a method for producing nanoparticulate titanium dioxide, comprising the steps of:
(i) providing an aqueous solution of an acidic titanyl compound;
(ii) hydrolyzing the titanyl compound to produce a titanium oxide-hydrate suspension;
(iii) filtering the suspension and washing the obtained titanium oxide-hydrate filter cake;
(iv) neutralizing the filter cake; and
(v) thermally treating the filter cake;
characterized in that said neutralizing is effected by adding an aqueous solution of alkali silicate and/or alkali aluminate.

In another aspect, the present invention relates to the titanium dioxide obtainable by the method described herein.

Finally, in a further aspect, the present invention is directed to the use of the nanoparticulate titanium obtainable by the method described herein as an adsorbent, photocatalyst, or process catalyst.

Further advantageous embodiments of the invention are stated in the dependent claims.

DESCRIPTION OF THE PREFERRED EMBODIMENTS OF THE INVENTION

These and further aspects, features and advantages of the invention become apparent to the skilled person from a study of the following detailed description of the preferred embodiments and claims. Each feature from one aspect or embodiment of the invention may also be used in any other aspect or embodiment of the invention. Numerical ranges stated in the form "from x to y" include the values mentioned and those values that lie within the range of the respective measurement accuracy as known to the skilled person. If several preferred numerical ranges are stated in this form, all the ranges formed by a combination of the different end points are also included. All percentages stated in connection with the compositions herein described relate to percent by weight unless explicitly stated otherwise, respectively based on the mixture of composition in question. The use of the term "about" is intended to encompass all values that lie within the range of the respective measurement accuracy known to the skilled person.

The term "substantially free" is intended to connote that the particular material is not detected (i.e. is below the detection limit) using standard commercial tests and methodologies used in the industry as of the earliest priority date of this application or otherwise is only detected in trace amounts such as might be caused by contaminants in the particular grade of materials used or arising from the manufacturing process. Unless otherwise stated, standard commercial grades of materials are used and it is preferred that the various materials are substantially free of other compounds.

Within the scope of the invention, "nanoparticulate titanium dioxide" means titanium dioxide with a primary particle size of at most 100 nm. "Primary particle", as used herein, relates to a particle which may form together with at least one other particle to form agglomerates and aggregates. This definition of primary particles also covers twins and multiple twins, which are known in the art and can be analyzed by, for example, TEM analysis.

The method of the invention starts with an aqueous solution of an acidic titanyl compound. For example, titanyl sulfate or titanium oxychloride are suitable as said titanyl compound. Titanyl sulfate is particularly preferred. Preferably the solution of acidic titanyl compound is substantially free of other compounds or at least substantially free of compounds other than those produced by or conventionally present in acidic titanyl compound solutions formed by the particular method used.

A particular embodiment of the method of the invention starts with a titanyl sulfate solution produced by a sulfuric acid digestion of titanium iron raw materials such as ilmenite ore. Such a titanyl sulfate solution is obtained, for example, in the course of the known method for producing titanium dioxide pigment according to the sulfate process. Preferably the titanyl sulfate solution is substantially free of compounds other than those produced by or conventionally present in solutions produced according to the sulfate process. In the titanyl sulfate solution, the water-soluble salts, such as iron sulfate, are crystallized and separated. Subsequently, the titanyl compound is hydrolyzed by known means and techniques, and titanium oxide-hydrate is precipitated. The precipitated microcrystalline titanium oxide-hydrate is separated by filtration, and the filter cake is washed and neutralized.

According to the invention, the neutralization of the filter cake is performed with an alkali silicate solution (water glass) and/or an alkali aluminate solution. The alkali silicate solution preferably contains sodium silicate and/or potassium silicate and/or lithium silicate at a concentration of from about 2 to about 20 mole percent. At a concentration of below 2 mole percent, crack formation in the filter cake still occurs. At a concentration of above 20 mole percent, the neutralization is inefficient as a higher amount of the silicate and/or aluminate, respectively, is used. More preferably, alkali aluminate solution is used. Sodium, potassium, and lithium are also preferred as alkali. The alkali aluminate solution more preferably contains sodium aluminate at a concentration of from about 2 to about 20 mole percent. Within the scope of the invention, "neutralization" means that a pH value within a range of from about 4 to about 9 is adjusted. More preferably, the pH value of the neutralized filter cake is within a range of from about 7 to about 8. The neutralization according to the invention results in an filter cake free of cracks, which can be very efficiently washed. The thus obtained washed product is purer than those of the prior art.

The neutralization takes place, for example, in a vessel in which the washed filter cake, optionally diluted with water, is admixed with said alkali silicate or sodium aluminate solution with stirring. In the case of using titanyl sulfate derived from the sulfate process for producing titanium dioxide, the washed filter cake of the titanium oxide-hydrate hydrolysis product usually has a pH value of from about 1 to about 2 before the neutralization.

In the neutralization with alkali silicate, there are formed readily soluble and readily washable alkali sulfate including, but not limited to, sodium sulfate, potassium sulfate and/or lithium sulfate as well as insoluble silicon oxide as reaction products. In the neutralization with sodium aluminate, there are formed readily soluble and readily washable sodium sulfate and insoluble aluminum oxide as reaction products.

The alkali silicate or sodium aluminate is added in such an amount that a pH value of from about 4 to about 9, preferably from about 7 to about 8, is obtained. The temperature is within a range of from about 25° C. to about 80° C., preferably from about 25° C. to about 60° C.

In a particular embodiment of the invention, the neutralization is effected by a hydrothermal method under conditions of increased pressure and temperature of from 80° C. to 180° C., preferably of from 100° C. to 160° C., at a pressure of from 1 bar to 5 bar, preferably of from 1.5 bar to 3 bar.

Subsequently, the neutralized titanium dioxide is filtered, washed and thermally treated. The thermal treatment takes place in aggregates known to the skilled person, such as spray dryers, conveyor dryers, or rack dryers. The temperature is at about 100° C. to 140° C. A nanoparticulate crystalline titanium dioxide product with an anatase structure is obtained. Alternatively, the neutralized, filtered and washed titanium dioxide can be pelletized and dried by means of an extruder, optionally with using an additional binder.

The obtained thermally treated product has an agglomerate structure and contains nanoparticulate titanium dioxide and the neutralization product silicon oxide and/or aluminum oxide. Depending on the drying method, the agglomerate size is at least about 500 µm, preferably from about 500 µm to 15 mm, more preferably from about 500 µm to about 10 mm, and most preferably from about 500 µm to about 5 mm. The specific surface area according to BET is from about 200 $m^2/g$ to about 400 $m^2/g$, preferably from about 200 $m^2/g$ to about 300 $m^2/g$. The dried agglomerates can then be dispersed and/or milled in water or a solvent in the usual way, in which the agglomerate size will reduce to from about 1 µm to about 5 µm.

The nanoparticulate titanium dioxide product according to the invention is characterized by a high adsorption capacity for heavy metals and polar compounds. It is suitable as a photocatalyst, process catalyst or adsorbent, and is preferably used in the field of gas purification and especially in the purification of aqueous systems. For example, the obtained product can be used as Claus catalyst, and metal adsorbent in water. Due to its high specific area, and purity, the catalyst is efficient compared to known catalysts.

Thus, the nanoparticulate titanium dioxide obtainable by the method disclosed herein form another part of the present invention.

Also encompassed by the present invention is the use of the nanoparticulate titanium dioxide obtainable by the herein described method as an adsorbent, photocatalyst, or process catalyst.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for producing nanoparticulate titanium dioxide, comprising the steps of:
    (i) providing an aqueous solution of an acidic titanyl compound;
    (ii) hydrolyzing the titanyl compound to produce a titanium oxide-hydrate suspension;
    (iii) filtering the suspension to form a titanium oxide-hydrate filter cake and washing the obtained filter cake;
    (iv) neutralizing the obtained filter cake to a pH of from about 4 to about 9 by adding an aqueous solution of alkali silicate, alkali aluminate or combinations directly to the obtained filter cake; and
    (v) thermally treating the filter cake to form nanoparticulate titanium dioxide.

2. The method of claim 1, wherein the aqueous solution of alkali silicate, alkali aluminate or combinations thereof has a concentration of alkali silicate, alkali aluminate or combinations thereof from about 2 to about 20 mole percent.

3. The method of claim 1, wherein the filter cake is neutralized to a pH of from about 7 to about 8 during neutralization.

4. The method of claim 1, wherein the nanoparticulate titanium dioxide at least partially forms agglomerates having a size of at least 500 μm.

5. The method of claim 4, wherein the agglomerates have a size from at least 500 μm to about 10 mm.

6. The method of claim 4, further comprising dispersing said nanoparticulate titanium dioxide in water or in a solvent.

7. The method of claim 6, wherein the dispersed nanoparticulate titanium dioxide at least partially forms agglomerates having a size of from about 1 to about 5 μm.

8. The method of claim 1 wherein the nanoparticulate titanium dioxide at least partially forms agglomerates having a specific surface area according to BET of from about 200 to about 400 m$^2$/g.

9. The method of claim 1 wherein the aqueous solution is sodium silicate, potassium silicate, lithium silicate, sodium aluminate or combinations thereof.

10. The method of claim 9, wherein the aqueous solution of sodium silicate, potassium silicate, lithium silicate, sodium aluminate or combinations thereof has a concentration of sodium silicate, potassium silicate, lithium silicate, sodium aluminate or combinations thereof from about 2 to about 20 mole percent.

11. The method of claim 9, wherein:
    the aqueous solution of sodium silicate, potassium silicate, lithium silicate, sodium aluminate or combinations thereof has a concentration of sodium silicate, potassium silicate, lithium silicate, sodium aluminate or combinations thereof from about 2 to about 20 mole percent;
    acidic titanyl compound is titanyl sulfate;
    the nanoparticulate titanium dioxide at least partially forms agglomerates having a size of at least 500 μm and a specific surface area according to BET of from about 200 to about 400 m$^2$/g.

12. The method of claim 11, wherein the filter cake is neutralized to a pH of from about 7 to about 8 during neutralization.

13. The method of claim 11, wherein the nanoparticulate titanium dioxide has an anatase structure.

14. The method of claim 1, wherein the nanoparticulate titanium dioxide has an anatase structure.

15. The method of claim 1, wherein the acidic titanyl compound is titanyl sulfate.

16. The method of claim 15, wherein the titanyl sulfate is obtained in the course of the sulfate process for producing titanium dioxide.

17. The method of claim 15, wherein the aqueous solution of alkali silicate, alkali aluminate or combinations thereof has a concentration of alkali silicate, alkali aluminate or combinations thereof from about 2 to about 20 mole percent.

18. The method of claim 15, wherein the filter cake is neutralized to a pH of from about 7 to about 8 during neutralization.

19. The method of claim 15, wherein the nanoparticulate titanium dioxide at least partially forms agglomerates having a size of at least 500 μm.

20. The method of claim 19, wherein the agglomerates have a size from at least 500 μm to about 10 mm.

21. The method of claim 19, further comprising dispersing said nanoparticulate titanium dioxide in water or in a solvent.

22. The method of claim 21, wherein the dispersed nanoparticulate titanium dioxide at least partially forms agglomerates having a size of from about 1 to about 5 μm.

23. The method of claim 15, wherein the nanoparticulate titanium dioxide at least partially forms agglomerates having a specific surface area according to BET of from about 200 m$^2$/g to about 400 m$^2$/g.

24. The method of claim 15, wherein the aqueous solution is sodium silicate, potassium silicate, lithium silicate, sodium aluminate or combinations thereof.

25. The method of claim 24, wherein the aqueous solution of sodium silicate, potassium silicate, lithium silicate, sodium aluminate or combinations thereof has a concentration of sodium silicate, potassium silicate, lithium silicate, sodium aluminate or combinations thereof from about 2 to about 20 mole percent.

26. The method of claim 15, wherein the nanoparticulate titanium dioxide has an anatase structure.

* * * * *